United States Patent [19]

Drees

[11] Patent Number: 5,215,497
[45] Date of Patent: Jun. 1, 1993

[54] FUME HOOD CONTROLLER

[75] Inventor: Kirk H. Drees, Cedarburg, Wis.

[73] Assignee: Johnson Service Company, Milwaukee, Wis.

[21] Appl. No.: 727,620

[22] Filed: Jul. 10, 1991

[51] Int. Cl.[5] .............................................. B08B 15/02
[52] U.S. Cl. ...................................................... 454/61
[58] Field of Search ........................ 454/56, 58, 59, 61

[56] References Cited

U.S. PATENT DOCUMENTS

| | | | |
|---|---|---|---|
| 3,996,796 | 12/1976 | Adler et al. | 73/861.22 |
| 4,466,341 | 8/1984 | Grogan | 454/61 |
| 4,497,242 | 2/1985 | Moyer | 454/61 |
| 4,528,898 | 7/1985 | Sharp . | |
| 4,706,553 | 11/1987 | Sharp et al. . | |
| 4,934,256 | 6/1990 | Moss et al. | 454/61 |
| 4,982,605 | 1/1991 | Oram et al. | 454/56 |
| 5,092,227 | 3/1992 | Ahmed et al. | 454/61 |

OTHER PUBLICATIONS

Krueger, Division of Philips Industries 36 page brochure entitled "System 3-Custom DDC VAV Laboratory Ventilation Equipment".
Landis & Gyr brochures regarding "Powers VAV Fume Hood Control System".
Cambridge Filter Corporation 2 page brochure entitled "AccuSensor Air Sentinel Air Flow Measuring Probe".

Primary Examiner—Harold Joyce
Attorney, Agent, or Firm—Foley & Lardner

[57] ABSTRACT

A fume hood controller utilizing feed forward and closed loop control to maintain a constant average face velocity of air entering the fume hood. A sash position sensor provides the controller with a signal indicative of the area of the fume hood opening. An air flow sensor provides the controller with a signal indicative of flow rate. Fast response to a change in sash position is provided by feed forward control which adjusts an air valve or fan to provide a constant face velocity. After initial adjustment by the feed forward control, closed loop control is operable to fine tune the air valve or fan to provide highly accurate control of face velocity. Emergency control is also provided to drive the air flow to a maximum rate when an emergency exhaust button located on the fume hood is pressed.

18 Claims, 3 Drawing Sheets

FUME HOOD CONTROLLER

FIELD OF THE INVENTION

This invention is related to laboratory fume hoods and more particularly to a fume hood control assembly for maintaining a constant average face velocity of air entering an opening in the fume hood as the size of the opening is varied.

BACKGROUND OF THE INVENTION

Fume hoods are enclosures used primarily in laboratories to carry out experiments and procedures that utilize or generate hazardous materials and contaminants. An opening is provided for access into the fume hood. The size of this opening may be changed by sliding a window which is mounted to move either vertically or horizontally. The window is typically moved by grasping a sash mounted along one side of the window. The window enables an operator to provide an opening just large enough to reach into the hood while visibly observing the experiment or procedure being conducted within the hood.

To remove hazardous gases and airborne materials, air is drawn through the opening and exhausted through an air duct typically located at the top of the fume hood. Moving air through the fume hood in this way minimizes exposure of the operator to the hazardous materials. It is important to regulate the velocity of air entering the fume hood (i.e., the face velocity). A face velocity that is too low will allow heavy gases and airborne particulate to spill out of the fume hood. A face velocity that is too high will create air turbulence that could eject the hazardous gases and particulate out through the fume hood opening.

Fume hood controllers of the type contemplated herein are used to control face velocity. Typical systems of this type are shown in U.S. Pat. No. 4,528,898, issued on July 16, 1985, to G. P. Sharp, et al., entitled "Fume Hood Controller," and U.S. Pat. No. 4,706,553, issued on Nov. 17, 1987, to G. P. Sharp, et al., entitled "Fume Hood Controller." Each of these patents is concerned with regulating the passage of air through the hood at a relatively constant face velocity by coordinating the position of the sash with the speed of a blower (i.e., fan) or the size of the opening of a damper (i.e., air valve) located in the exhaust duct. These control systems include a transducer for monitoring the position of the sash to provide a signal indicative of the area of the opening. In one system, the blower is maintained at a predetermined speed and the volume of air passing through the damper is controlled to provide a relatively constant face velocity through the hood. In an alternative system, a variable motor speed controller is responsive to the transducer to provide a blower speed which varies as a function of the sash opening.

The systems disclosed in these patents utilize open loop control which necessarily assumes that the damper and blower perform as they were designed and calibrated. However, the hood exhaust duct, damper, and blower are subject to corrosion and accumulation of exhausted materials over time which causes the performance characteristics of the damper and blower to change and which can unpredictably affect the flow rate of air through the exhaust duct and damper. Sensing the position of the damper does not account for these changes and therefore does not provide a reliable indication of air flow. Moreover, unless air flow is actually sensed, abnormal flow conditions, such as the blower stopping or an exhaust duct obstruction, may exist undetected.

Others have provided fume hood controllers utilizing closed loop control which provides greater accuracy than open loop systems and permits detection of abnormal flow conditions. Two examples of such systems are described in the Landis & Gyr Powers VAV Fume Hood Control System brochure and the Krueger System 3 Custom DDC VAV Laboratory Ventilation Equipment brochure.

In fume hood control assemblies, it is critical that the necessary change in air flow occur within four seconds after the sash position has changed. Otherwise, hazardous gases and airborne particulate may escape through the fume hood opening. In closed loop control of fume hood face velocity, there is an inverse relationship between system response speed and system stability. Therefore, faster response can only be obtained at the expense of stability. Configuring a closed loop system to control air flow within the critical four seconds results in an undesirably unstable response that, at a minimum, lasts for several minutes. Thus, there is a need for a fume hood controller that provides fast, stable response to changes in sash position while maintaining accurate control of the face velocity of air entering the fume hood opening.

SUMMARY OF THE INVENTION

The present invention addresses the aforementioned shortcomings of open loop and closed loop only control by utilizing both feed forward and closed loop control to maintain a constant face velocity. A sash sensor transmits a signal to a fume hood controller indicative of the size of the opening in the fume hood. The controller calculates the air flow required to provide the desired face velocity and adjusts the position of a hood exhaust air valve to provide the required flow. The fume hood controller provides feed forward control to reposition the hood exhaust air valve quickly in response to changes in sash position. After this initial repositioning of the air valve, the actual air flow is sensed by a vortex shedding flow transmitter and compared to the required air flow in a closed loop control to fine tune the air valve position to provide the desired face velocity.

In a second embodiment, a closed loop only control system operates to control the air valve in accordance with the deviation of a face velocity set point from actual face velocity. Actual face velocity is determined by calculating the size of the hood opening based upon the sensed sash position and using that calculated area to convert the air flow rate sensed by the air flow sensor into face velocity.

The fume hood controller also includes an alarm and indication panel to communicate with the user of the fume hood. The fume hood controller calculates the average face velocity and transmits it to the alarm and indication panel. If the calculated face velocity varies from a set point the high or low face velocity alarm light illuminates and an audible alarm sounds.

The fume hood controller also includes an emergency exhaust button on the alarm and indication panel which overrides the normal control and forces the system to maximum flow regardless of sash position.

One of the primary features of the present invention is the combination of a feed forward control that provides a fast response to changes in sash position with a closed loop system that accounts for errors and changes in the performance characteristics of the air valve or fan to obtain a constant, set face velocity.

Other principal features and advantages of the invention will become apparent to those skilled in the art upon review of the following drawings, the detailed description, and the appended claims.

Figure 1:
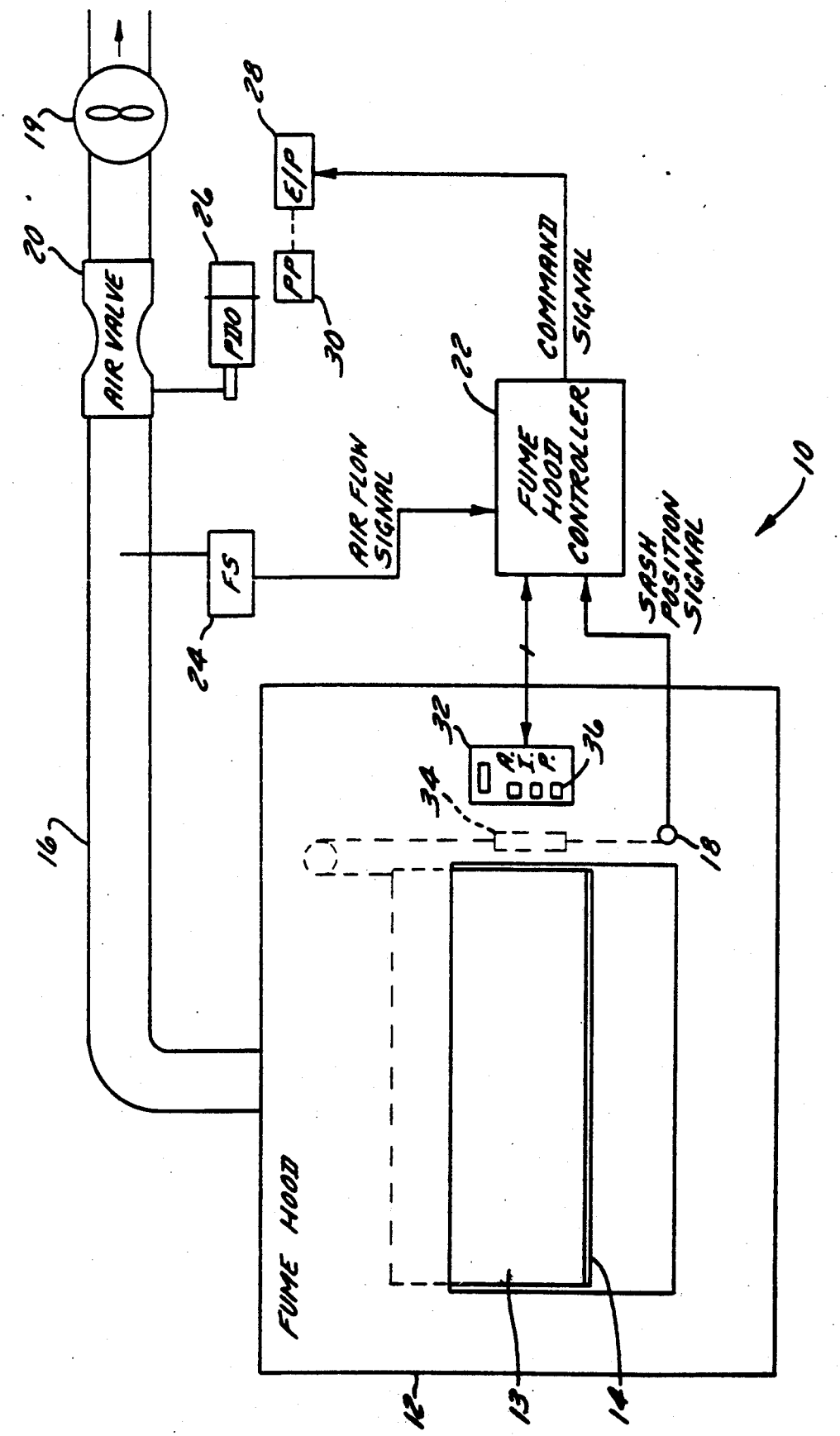
FIG. 1 is a block diagram of the fume hood control assembly.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

As shown in FIG. 1, the fume hood assembly 10 includes a fume hood 12 having a window 13 with a sash 14 and an exhaust duct 16 connected to the top of hood 12. Sash 14 is typically an extrusion located along the bottom edge of window 13 which can be grasped by a user to slide window 13 vertically. A sash position sensor 18 is mounted in hood 12 to sense the position of sash 14. Air is pulled into the opening of hood 12 and out through exhaust duct 16 by a fan 19. An air exhaust valve 20 is provided in exhaust duct 16 to control the face velocity of air passing through fume hood 12. Sash position sensor 18 is connected to a fume hood controller 22.

A flow sensor 24 connected to fume hood controller 22 is positioned to sense the flow rate of air passing through exhaust duct 16. A pneumatic damper operator 26 is connected to air valve 20 to open or close air valve 20 as required. An electric to pressure transducer 28 is connected to fume hood controller 22 and to a pneumatic pilot positioner 30 which controls pneumatic damper operator 26. An alarm and indication panel 32 is connected to fume hood controller 22.

As shown in FIG. 1, sash position is sensed by sash position sensor 18, which is a potentiometer having a variable resistance set by a spring loaded cable attached to a counterweight 34 or, alternatively, to the cable connecting counterweight 34 to window 13. More particularly, sash sensor 18 is an analog linear position transducer as manufactured by UniMeasure, Inc., of Corvallis, Oregon. It includes an integral three wire potentiometer which is used as a voltage divider circuit to provide a differential voltage output directly proportional to the length of cable extension. Vertical movement of counterweight 34 corresponds to movement of sash 14. It will of course be understood by those skilled in the art that other means of sensing the size of the opening in fume hood 12 may be employed. For instance, in other assemblies where sash 14 is provided, a linear resistive strip (also known as a soft potentiometer) could be mounted along a vertical edge of the fume hood opening such that a protrusion mounted at the end of sash 14 would depress the resistive strip to indicate the location of sash 14. Similarly, magnetic switches could be placed along this vertical edge of the fume hood opening with a magnet mounted at the end of sash 14. Alternatively, an ultrasonic transmitter and receiver could be employed to sense the position of sash 14 or counterweight 34.

Hood exhaust air valve 20 is a pressure independent venturi style air valve as manufactured by VAV Ventui Corporation of Madison, Wisconsin. The air valve used should preferably be pressure independent and have a very predictable position versus flow rate characteristic. A butterfly valve may be used in place of air valve 20, if desired. However, because butterfly valves are pressure dependent, the position versus flow rate relationship of a butterfly valve is a function of damper authority, duct pressure, and sash position and fume hood controller 22 may require a more complex, multi-input model than discussed herein to accurately characterize this type of valve.

Pneumatic damper operator 26 is a standard pneumatic actuator with pilot positioner 30 as manufactured by Johnson Controls, Inc. of Milwaukee, Wis. It converts a three to fifteen psig input to a linear 0–3 inch of travel.

Electric to pressure transducer 28 converts a 0 to 10 VDC input to a 0 to 20 psig signal. Such a device is manufactured by LDI Pneutronics Corporation of Hollis, N.H. An electric to pressure transducer having an integral position feedback can be used to replace both pilot positioner 30 and electric to pressure transducer 28.

Flow sensor 24 can be a vortex shedding flow meter, such as the VorTek Airflow Transmitter manufactured by Tek-Air Systems Inc. of Northvale, N.J. This meter provides a 4–20 ma output which is directly proportional to the air velocity. This flow sensor has a low velocity sensing threshold of 350 feet per minute. Vortex shedding technology is preferable over other flow sensing means, such as thermal or pitot, because it is relatively corrosion resistant, has a good turn down ratio (i.e., it works well at fairly low flow rates), and provides an output directly proportional to the sensed flow rate. A vortex shedding flow meter which uses an ultrasonic transducer to sense eddy currents can be used in place of the Tek-Air flow meter. Ultrasonic sensing permits sensing of flow rates down to 100 feet per minute and is relatively immune to contamination.

Fume hood controller 22 as more fully described below is a standard digital controller such as the AS10-LCP200-0 manufactured by Johnson Controls, Inc. of Milwaukee, Wis. It includes a unique, graphic programming language which is utilized in lieu of textual programming. This programming language can be used to provide the AS-LCP200-0 with the instructions necessary to implement the present invention. Of course, a controller utilizing a textual programming language may be used as well. Alternatively, a discrete circuit could be used to implement fume hood controller 22. Fume hood controller 22 is more specifically described in connection with FIG. 2.

Fume hood controller 22 provides a COMMAND SIGNAL to electric to pressure transducer 28 which in turn operates air valve 20 by way of pilot positioner 30 and pneumatic damper operator 26. Other means for controlling the rate of air flow through exhaust duct 16 (and, hence, face velocity) could be used. For instance, COMMAND SIGNAL could be used to vary the speed of fan 19, eliminating the need for air valve 20, pneumatic damper operator 26, electronic to pressure transducer 28 and pilot positioner 30. As hereinafter described, COMMAND SIGNAL is generated in accordance with a SASH POSITION SIGNAL generated by sash sensor 18 and an AIR FLOW SIGNAL generated by flow sensor 24.

Alarm and indication panel 32 provides the operator of fume hood 12 with alarm and operating information which is displayed in a user friendly format. Panel 32 connects to fume hood controller 22 which calculates the average face velocity and transmits it to an indicator on panel 32. If controller 22 senses a system failure an alarm light illuminates and an audible alarm sounds. In the event of an emergency, an emergency button 36 on panel 32 may be pushed to override normal control and drive the system to maximum flow regardless of the sash position.

Figure 2A:
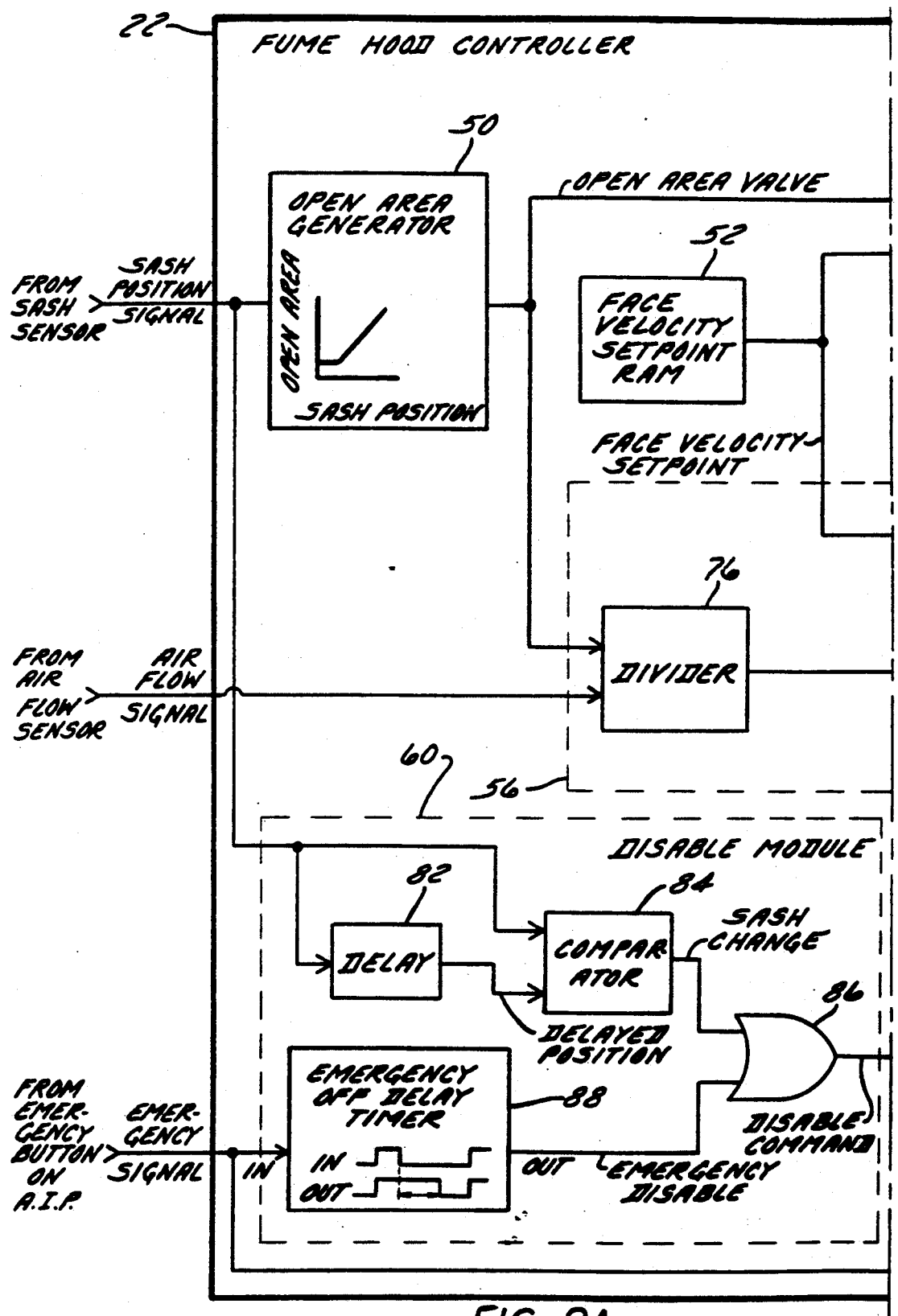
FIGS. 2A and 2B are block diagrams of the fume hood controller shown in FIG. 1.
Figure 2B:
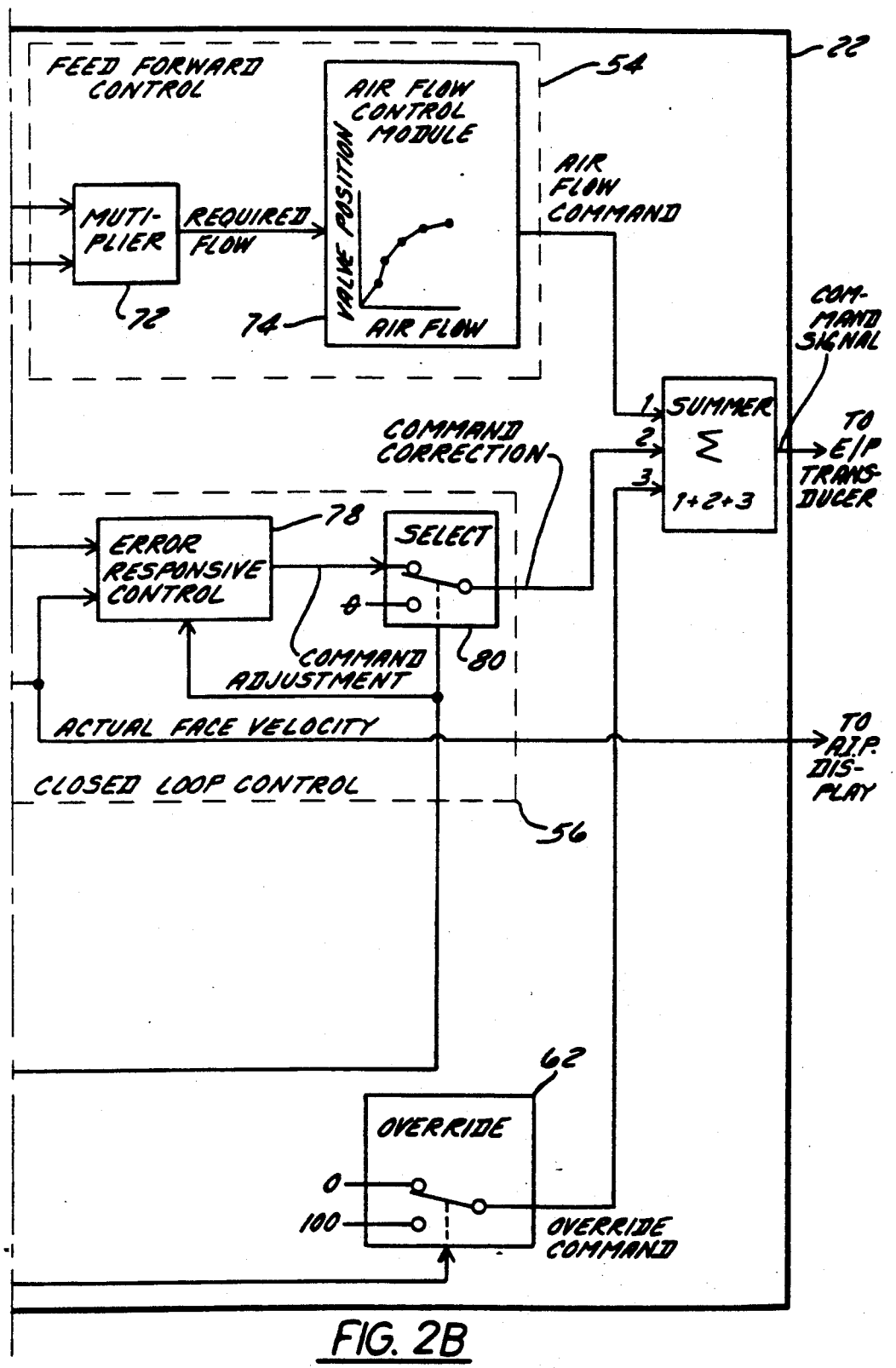

Referring now to FIGS. 2A and 2B fume hood controller 22 includes an open area generator 50, a random access memory (RAM) 52 for storing a face velocity set point, a feed forward control 54, a closed loop control 56, a summer 58, a disable module 60, and an override 62. Sash sensor 18 generates SASH POSITION SIGNAL which is provided to open area generator 50 and disable module 60. Open area generator 50 is connected to feed forward control 54 and closed loop control 56. Setpoint RAM 52 is connected to feed forward control 54 and closed loop control 56, which in turn are connected to summer 58. Summer 58 provides COMMAND SIGNAL to electric to pressure transducer 28. AIR FLOW SIGNAL generated by flow sensor 24 is provided to closed loop control 56. An EMERGENCY SIGNAL from alarm and indication panel 32 is provided to disable module 60 and override 62 within fume hood controller 22. Disable module 60 is connected to closed loop control 56. Override 62 is connected to summer 58.

Feed forward control 54 includes a multiplier 72 and an air flow control model 74. Open area generator 50 is connected to multiplier 72. Setpoint RAM 52 is also connected to multiplier 72. Multiplier 72 is connected to air flow control model 74, which in turn is connected to summer 58.

Closed loop control 56 includes a divider 76, an error responsive control 78, and a select 80. Open area generator 50 is connected to divider 76. Flow sensor 24 is connected to divider 76. Setpoint RAM 52 is connected to error responsive control 78. Divider 76 is connected to error responsive control 78 and alarm and indication panel 32. Error responsive control 78 is connected to select 80, which in turn is connected to summer 58.

Disable module 60 includes a delay 82, a comparator 84, a logical OR gate 86, and an emergency off delay timer 88. Sash sensor 18 is connected to delay 82 and comparator 84. Delay 82 is connected to comparator 84 which is connected to OR gate 86. Emergency button 36 on panel 32 is connected to timer 88 which in turn is connected to OR gate 86. OR gate 86 is connected to select 80 and error responsive control 78.

OPERATION OF THE FUME HOOD CONTROLLER

With continued reference to FIGS. 1, 2A and 2B, the following is a description of the operation of a preferred embodiment of fume hood assembly 10, and more particularly, fume hood controller 22. During normal operation (i.e., no emergency situation exists), fume hood controller 22 utilizes a combination of two modes of system control. The first mode uses feed forward control 54 to provide open loop control of face velocity as a function of the sash position. The second mode uses closed loop control 56 to control face velocity in accordance with the deviation of the actual face velocity from a predetermined set point stored in setpoint RAM 52. Feed forward control 54 generates an AIR FLOW COMMAND that is arithmetically added by summer 58 to the COMMAND CORRECTION generated by closed loop control 56 and OVERRIDE COMMAND provided by override 62. The result generated by summer 58 is the COMMAND SIGNAL which is provided to electric to pressure transducer 28 to thereby position air valve 20 to provide a constant, predetermined face velocity.

This combination of feed forward and closed loop control provides the speed of open loop control with the accuracy of an error driven closed loop system. Feed forward control 54 essentially provides initial adjustment of air valve 20 to the approximate position required to effect setpoint face velocity. Since this open loop control is not error driven, it does not have to wait for an error in face velocity to appear. Therefore, feed forward control 54 provides relatively immediate control of the face velocity of the air entering fume hood 12, limited only by the speed limitations inherent in the components used in fume hood assembly 10. Additionally, because feed forward control 54 provides initial positioning of air valve 20, closed loop control 56 can be operated within a relatively narrow proportional band. That is, closed loop control 56 need only provide fine tuning of air valve 20 and therefore can be made relatively sensitive to errors between the actual and setpoint face velocities, thereby providing very accurate and responsive control of face velocity.

Although not necessary to the broader aspects of the invention, disable module 60 and select 80 may be provided to eliminate any interplay between feed forward control 54 and closed loop control 56 during the period of time that feed forward control 54 is changing the position of air valve 20 in response to a change in sash position. Simultaneous operation of feed forward control 54 and closed loop control 56 during this time would result in the system overshooting the air valve adjustment necessary to maintain a constant face velocity. The disable module 60 operates to force COMMAND CORRECTION to zero for a short time after a change in the sash position has been detected. This effectively disables closed loop control 56 for a short time to allow feed forward control 54 to move air valve 20 to the new position required to maintain setpoint face velocity. As will be described in more detail, OVERRIDE COMMAND provided to summer 58 is normally zero and does not affect COMMAND SIGNAL. Therefore, during the short time that closed loop control 56 is disabled, COMMAND SIGNAL is equal to AIR FLOW COMMAND generated by feed forward control 54.

The detailed operation of feed forward control 54 is as follows. Open area generator 50 receives SASH POSITION SIGNAL from sash sensor 18 and uses this signal to generate an OPEN AREA VALUE representative of the size of the opening in the fume hood. The FACE VELOCITY SET POINT provided by setpoint RAM 52 is multiplied by OPEN AREA VALUE in multiplier 72. The resulting REQUIRED FLOW generated by multiplier 72 is representative of the air flow through exhaust duct 16 necessary to maintain a constant face velocity. Conversion of FACE VELOCITY SET POINT to this REQUIRED FLOW can be seen dimensionally. FACE VELOCITY SET POINT is a velocity in units of feet per minute (ft/min). REQUIRED FLOW is related to the volume of air that desirably will flow through exhaust duct 16 over a period of time and has units of $ft^3$/min. OPEN AREA VALUE has units of $ft^2$. Thus, multiplying FACE VELOCITY SET POINT (ft/min) times OPEN AREA VALUE ($ft^2$) results in REQUIRED FLOW ($ft^3$/min).

REQUIRED FLOW is provided to air flow control model 74 which translates flow rate to an AIR FLOW COMMAND indicative of air valve position. Air flow control model 74 models the flow rate versus position characteristic of air valve 20. Thus, the model must be predetermined in accordance with the particular characteristics of the means used to control air flow. This model can be implemented in a variety of ways, including a second or third order polynomial equation or a piecewise linear equation stored as a look-up table in a read only memory (ROM) or a battery backed-up volatile memory such as a RAM. AIR FLOW COMMAND is then added by summer 58 to COMMAND CORRECTION and OVERRIDE COMMAND to produce COMMAND SIGNAL which operates electric to pressure transducer 28.

Open area generator 50 is used only to convert the position of sash 14 to a value indicative of the size of the opening in fume hood 12. Since window 13 is rectangular with a constant length, the area ($ft^2$) of the opening is simply window length (ft) multiplied by the sash position, i.e., height of the sash (ft). Open area generator 50 need not be used if fume hood controller 22 is provided with a size signal directly representative of the opening area. Rather, this size signal could be applied directly to multiplier 72 and divider 76.

Open area generator 50 can convert sash position to area in a variety of different ways. Since most fume hoods have openings of rectangular area with one side of the rectangle being the movable sash, the opening area is linear with respect to the position of the sash and can be calculated as described above. This will not be true for all positions of sash 14, however, because fume hoods typically are designed so that a minimum opening exists regardless of sash position. This minimum opening ensures a minimum air flow through the hood to continuously remove hazardous materials and other contaminants. In these hoods, the opening area will be constant below a certain sash position as roughly depicted by open area generator 50 in FIG. 2A. Implementation of these relationships can be achieved either by an equation or a piecewise linear curve which can be stored in memory as a look-up table.

It will be understood by those skilled in the art that the FACE VELOCITY SET POINT can be provided by storage means other than a random access memory. For instance, FACE VELOCITY SET POINT could be stored in a ROM (as well as a PROM, EPROM, or an EEPROM), which could then be placed into RAM so that it may be adjusted if desired. In a discrete implementation of the present invention, FACE VELOCITY SET POINT could be provided as a reference voltage or other means known to those skilled in the art. FACE VELOCITY SET POINT should preferably correspond to a velocity of 80 to 120 ft/min.

Closed loop control 56 provides correction for inaccuracies in air flow control model 74. These inaccuracies exist because it is impossible to exactly model the characteristics of air valve 20. Moreover, these characteristics may change over time due to such factors as nonrepeatability of the position of air valve 20 in response to a certain input and build up of contamination inside air valve 20. Additionally, the characteristics of pneumatic damper operator 26, pilot positioner 30, and electric to pressure transducer 28 may change over time resulting in a changed open loop performance. Closed loop control 56 accounts for these inaccuracies and time dependent changes.

The particularized operation of closed loop control 56 is as follows. AIR FLOW SIGNAL, in units of $ft^3$/min, provided by flow sensor 24 is arithmetically divided by OPEN AREA VALUE ($ft^2$). This is accomplished by divider 76. The result is an ACTUAL FACE VELOCITY, in units of ft/min, which is compared by error responsive control 78 to FACE VELOCITY SET POINT to generate the COMMAND ADJUSTMENT. ACTUAL FACE VELOCITY generated by divider 76 is conveniently provided to alarm and indication panel 32 and there displayed for the fume hood user. Select 80 generates COMMAND CORRECTION which is equal to either COMMAND ADJUSTMENT or zero in accordance with the DISABLE COMMAND from disable module 60. As previously discussed, COMMAND CORRECTION is combined with AIR FLOW COMMAND and OVERRIDE COMMAND by summer 58 to produce COMMAND SIGNAL.

Divider 76 provides a convenient means for generating the actual face velocity for displaying to a user of the fume hood. In another embodiment of the present invention, divider 76 would not be required because AIR FLOW SIGNAL from flow sensor 24 may be fed directly into error responsive control 78 and compared to REQUIRED FLOW generated by multiplier 72 rather than to FACE VELOCITY SET POINT. Therefore, either face velocities (FACE VELOCITY SET POINT and ACTUAL FACE VELOCITY) or air flows (REQUIRED FLOW and AIR FLOW SIGNAL) may be used by closed loop control 56 to position air valve 20.

Error responsive control 78 can be either a proportional plus integral controller or a proportional plus integral plus derivative controller, both of which are well known to those skilled in the art. The proportional band of error responsive control 78 depends upon the accuracy of air flow control model 74. If a highly accurate third order polynomial equation is used to implement air flow control model 74 then the proportional band of error responsive control 78 may be set to be relatively narrow, increasing the sensitivity of closed loop control 56 to deviations of ACTUAL FACE VELOCITY from FACE VELOCITY SET POINT. The accuracy of air flow control model 74 will change over time as the characteristics of air valve 20 change. The proportional band of error responsive control 78 may be designed to accommodate this eventual change in accuracy. Alternatively, means could be provided to manipulate the proportionality factor (thereby affecting the range of the proportional band) as a function of the size of the error between the actual and set face velocities.

Operation of both feed forward control 54 and closed loop control 56 during movement of sash 14 can result in fume hood controller 22 commanding air valve 20 to make a greater change of position than is required to accommodate the changed sash position. This overshoot occurs because movement of sash 14 will slightly lead the concomitant change in air valve position resulting in a large error that will be detected by closed loop control 56. Accordingly, the magnitude of COMMAND CORRECTION generated by closed loop control 56 will be large. Since feed forward control 54 responds quickly to the change in sash position, AIR FLOW COMMAND will already represent the required new air valve position. Thus, the summation of AIR FLOW COMMAND and COMMAND CORRECTION will produce a COMMAND SIGNAL that overadjusts the air valve position. It is therefore desirable to temporarily disable closed loop control 56 upon sensing a change in sash position.

Select 80 is therefore provided within closed loop control 56 to interrupt its operation in response to a DISABLE COMMAND from disable module 60 by setting COMMAND CORRECTION to zero during the time it is desirable to have closed loop control 56 disabled.

Disable module 60 operates in response to SASH POSITION SIGNAL to disable closed loop control 56 for a short period of time commencing upon movement of sash 14. SASH POSITION SIGNAL is provided to delay 82 which delays SASH POSITION SIGNAL for a predetermined amount of time. This delay may be implemented by a single pole digital filter. Comparator 84 therefore compares SASH POSITION SIGNAL with a previous value thereof. As long as the sash position remains unchanged, these two values are equal and the SASH CHANGE produced by comparator 84 will be a logical zero and will therefore not cause OR gate 86 to disable closed loop control 56. Upon detecting a change in sash position greater than five percent, comparator 84 generates a logical one which causes OR gate 86 to disable closed loop control 56 via select 80. A threshold of up to ten percent of sash position may be used. Because comparator 84 compares the instantaneous sash position with its previous position, a change in sash position may be immediately detected by comparator 84 which will then cause OR gate 86 to interrupt closed loop control 56 immediately. Moreover, the inputs to comparator 84 will not be equal immediately upon cessation of movement of sash 14. Rather, these inputs will not be equal until after the amount of time provided by delay 82. Thus, delay 82 may be set to disable closed loop control 56 for a desired amount of time after movement of sash 14 has stopped to provide air valve 20 with enough time to move to the new position as determined by feed forward control 54. Of course, other means known to those skilled in the art may be employed to controllably interrupt closed loop control 56.

Error responsive control 78 includes integral control. It will therefore continue to integrate the difference between ACTUAL FACE VELOCITY and FACE VELOCITY SET POINT during the time that closed loop control 56 is interrupted by disable module 60. Once DISABLE COMMAND returns to a logical zero, thereby allowing COMMAND ADJUSTMENT to be provided to summer 58 as COMMAND CORRECTION, the integrated error, which by this time might have grown quite large, can cause a significant, undesirable change in the position of air valve 20, which by that time will already have been initially positioned due to feed forward control 54. Therefore, to achieve smooth (bumpless) transfer from feed forward only operation to feed forward plus closed loop operation, DISABLE COMMAND should be provided to error responsive control 78 to remove the integrated error prior to reestablishment of closed loop operation.

It is preferable to equip fume hood assembly 10 with a means for quickly driving the air flow through fume hood 12 to a maximum rate which can be achieved simply by fully opening air valve 20. As shown in FIG. 1, emergency button 36 on panel 32 allows the user to signal fume hood controller 22 that an emergency situation exists and that the air flow should be increased to the maximum rate. Referring again to FIG. 2A and 2B, emergency button 36 is connected to disable module 60 and override 62 within fume hood controller 22. Within disable module 60, emergency button 36 is connected to emergency off delay timer 88.

Override 62 provides binary to analog conversion of EMERGENCY SIGNAL. Its output is zero when EMERGENCY SIGNAL is a logical zero such that air valve position is not affected. Upon EMERGENCY SIGNAL changing to a logical one, override 62 is operable to provide summer 58 with a value suitable for commanding air valve 20 to open fully. EMERGENCY SIGNAL generated by emergency button 36 is, during normal operation, equivalent to a logical zero. Thus, EMERGENCY SIGNAL normally does not affect COMMAND SIGNAL produced by summer 58. Additionally, during normal operation timer 88 generates a logical zero so that DISABLE COMMAND generated by OR gate 86 is not affected by EMERGENCY SIGNAL.

Upon emergency button 36 being pressed, EMERGENCY SIGNAL changes to a logical one, to which override 62 is responsive to provide summer 58 with the value needed to drive air valve 20 fully open, thereby creating maximum flow. This short control path optimizes the response speed of fume hood controller 22 to the emergency situation indicated by the user via emergency button 36. Fully opening air valve 20 will result in a face velocity in excess of the face velocity set point, which closed loop control 56 and, more particularly, error responsive control 78, via flow sensor 24, will try to correct. Therefore, disable module 60 includes means for instructing select 80 to interrupt operation of closed loop control 56 so that COMMAND ADJUSTMENT generated by error responsive control 78 will not be provided to summer 58 as the COMMAND CORRECTION. To effect this interruption, EMERGENCY SIGNAL is provided via timer 88 to OR gate 86 to command select 80 to force COMMAND CORRECTION to a zero value. As previously discussed, OR gate 86 is also provided to error responsive control 78 to remove any integrated error, thereby providing bumpless reestablishment of closed loop operation upon DISABLE COMMAND returning to a logical zero.

Other means of disabling closed loop control 56 may be utilized. For instance, the value of OVERRIDE COMMAND could be chosen to add into summer 58 a value large enough that air valve 20 would be driven fully open regardless of the correction value provided by closed loop control 56, thereby effectively disabling closed loop control 56.

EMERGENCY SIGNAL is reset to a logical zero by the user via panel 32. Once this occurs, timer 88 continues to provide a logical one to OR gate 86 for a short time. For the same reasons discussed in connection with delay 82, disabling closed loop control 56 for this short period of time after EMERGENCY SIGNAL as been reset permits air valve 20 the time needed to move to the position indicated by air flow control model 74.

OR gate 86 is provided only to accommodate the emergency control described above. If emergency button 36 and timer 88 are not employed, OR gate 86 is not needed and comparator 84 can be used to operate select 80 directly.

In accordance with another embodiment of the present invention, feed forward control 54 is not used for air valve positioning so that face velocity is regulated only by closed loop control 56. In this embodiment, open area generator 50, setpoint RAM 52, and closed loop control 56 are the only elements needed. Moreover, as previously discussed, open area generator 50 is not needed if fume hood controller 22 is provided with a signal directly representative of the size of the opening in the fume hood. Additionally, if disable module 60 is not employed then select 80 may be eliminated with COMMAND ADJUSTMENT provided directly to electric to pressure transducer 28. Although not necessary to the present invention, emergency button 36, summer 58, disable module 60, override 62, and select 80 would preferably be included to permit emergency control. Since feed forward control 54 is not used in this embodiment, the need for delay 82 and comparator 84 to control interplay between closed loop control 56 and feed forward control 54 is eliminated and these elements can therefore be omitted. In this regard, OR gate 86 may be omitted and timer 88 instead connected directly to select 80 and error responsive control 78 within closed loop control 56.

Thus, it should be apparent that there has been provided in accordance with the present invention a fume hood controller that fully satisfies the aims and advantages described herein. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

I claim:

1. An air flow control assembly for controlling the face velocity of air entering an opening of variable size in a fume hood having an air discharge duct, comprising:
    sensor means for generating a size signal representative of the size of said opening;
    an air flow sensor for generating an air flow signal representative of the rate of air flow in said discharge duct;
    air flow control means for controlling the face velocity of air entering said opening, wherein said air flow control means has a non-linear flow rate characteristic;
    a fume hood controller coupled to said sensor means, said air flow sensor, and said air flow control means, said fume velocity setpoint, a feed forward control responsive to said size signal and said face velocity setpoint for generating an air flow command, a closed loop control responsive to said size signal, said air flow signal, and said face velocity setpoint for generating a command correction in accordance with the deviation of said face velocity from said face velocity setpoint, and means for combining said air flow command and said command correction to generate a command signal; wherein said fume hood controller adjusts said air flow control means to maintain said face velocity substantially constant.

2. An assembly as defined in claim 1, wherein said fume hood further includes a sash for varying the size of said opening and wherein said sensor means senses the position of said sash.

3. An assembly as defined in claim 1, wherein said feed forward control includes multiplier means responsive to said size signal and said face velocity setpoint for generating a required flow value representative of the flow rate required through said air discharge duct to maintain said face velocity substantially constant.

4. An assembly as defined in claim 3, wherein said feed forward control further includes modelling means responsive to said required flow value for generating said air flow command.

5. An assembly as defined in claim 1, wherein said closed loop control comprises:
    divider means responsive to said size signal and said air flow signal for determining said face velocity; and
    an error responsive controller for generating said command correction in accordance with the deviation of said face velocity from said face velocity setpoint.

6. An assembly as defined in claim 5, wherein said error responsive controller is a proportional plus integral controller.

7. An assembly as defined in claim 1, wherein said closed loop control comprises:
    multiplier means responsive to said size signal and said face velocity setpoint for determining a required flow value; and
    an error responsive controller for generating said command correction in accordance with the deviation of said air flow signal from said required flow value.

8. An assembly as defined in claim 1, further comprising disabling means for controllably interrupting said closed loop control, whereby said command signal is substantially equal to said air flow command.

9. An assembly as defined in claim 8, wherein said disabling means includes means for detecting a change in the size of said opening and further wherein said detecting means temporarily interrupts said closed loop control when the size of said opening is changed.

10. An assembly as defined in claim 9, wherein said closed loop control comprises selecting means responsive to said disabling means for interrupting said closed loop control, whereby said command signal is substantially equal to said air flow command.

11. An assembly as defined in claim 9, wherein said detecting means includes delay means responsive to said size signal for generating a time shifted value and comparator means for comparing said time shifted value with said size signal.

12. An assembly as defined in claim 1, further comprising switching means connected to said fume hood controller for adjusting said air flow control means to increase the flow of air through said discharge duct to a maximum rate when said switching means is activated.

13. An assembly as defined in claim 12, wherein said fume hood controller further comprises emergency disabling means responsive to said switching means for disabling said closed loop control when said switching means in activated.

14. An assembly as defined in claim 1, wherein said setpoint means comprises a random access memory.

15. An assembly as defined in claim 1, wherein said airflow control means includes a damper.

16. An assembly as defined in claim 4, wherein said modelling means generates said air flow command in response to a polynomial equation representative of said air flow characteristic.

17. An assembly as defined in claim 4, wherein said modelling means generates said air flow command in response to a piecewise linear equation representative of said air flow characteristic.

18. An air flow control assembly for controlling the velocity of air entering an opening in a fume hood having an air discharge duct and a positionable sash for adjusting the size of the opening, comprising:
a sash sensor for generating a sash position signal representative of the position of said sash;
an air flow sensor for generating an air flow signal representative of the rate of air flow in said discharge duct;
air flow control means for controlling the face velocity of air entering said opening, wherein said air flow control means includes an air valve in said discharge duct; and
a fume hood controller connected to said sash sensor, said air flow sensor, and said air flow control means, said fume hood controller including setpoint means for providing a face velocity setpoint, area value generating means responsive to said sash position signal for determining an open area value representative of the size of said opening, a feed forward control responsive to said open area value and said face velocity setpoint for generating an air flow command, wherein said feed forward control includes means for modelling said air valve, a closed loop control responsive to said air flow signal, said open area value, and said face velocity setpoint and including an error responsive controller for generating a command correction in accordance with the deviation of said face velocity from said face velocity setpoint, summation means for adding said air flow command and said command correction to adjust the position of said air valve to maintain said face velocity substantially constant, and disabling means responsive to said sash position signal, for temporarily interrupting said closed loop control when the position of said sash is changed.

* * * * *